(12) United States Patent
Kitajima (10) Patent No.: US 8,466,983 B2
(45) Date of Patent: Jun. 18, 2013

(54) IMAGE PROCESSING APPARATUS PERFORMING WHITE BALANCE CONTROL

(75) Inventor: Kotaro Kitajima, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 434 days.

(21) Appl. No.: 11/854,198

(22) Filed: Sep. 12, 2007

(65) Prior Publication Data

US 2008/0068468 A1 Mar. 20, 2008

(30) Foreign Application Priority Data

Sep. 15, 2006 (JP) ................................ 2006-250846

(51) Int. Cl.
*H04N 9/73* (2006.01)

(52) U.S. Cl.
USPC ...................................... 348/223.1

(58) Field of Classification Search
USPC ................. 348/223.1, 224.1, 225.1, 222.1
See application file for complete search history.

(56) References Cited

U.S. PATENT DOCUMENTS

| 5,530,474 | A | 6/1996 | Takei | |
|---|---|---|---|---|
| 6,670,987 | B1 * | 12/2003 | Taura | 348/223.1 |
| 7,212,235 | B2 * | 5/2007 | Nakayama et al. | 348/223.1 |
| 2003/0169354 | A1 * | 9/2003 | Aotsuka | 348/272 |
| 2004/0046876 | A1 * | 3/2004 | Nakayama et al. | 348/231.1 |
| 2006/0132870 | A1 * | 6/2006 | Kitajima | 358/516 |

FOREIGN PATENT DOCUMENTS

| JP | 02-272892 A | 11/1990 |
|---|---|---|
| JP | 5-64219 A | 3/1993 |
| JP | 8-79786 A | 3/1996 |
| JP | 02-782527 B2 | 8/1998 |
| JP | 2000-224608 A | 8/2000 |
| JP | 2000-299876 A | 10/2000 |
| JP | 2001-197516 A | 7/2001 |
| JP | 2004-274482 A | 9/2004 |
| JP | 2004-282133 A | 10/2004 |

* cited by examiner

*Primary Examiner* — Nicholas Giles
(74) *Attorney, Agent, or Firm* — Canon USA Inc. IP Division (57) ABSTRACT

An image processing apparatus includes a white balance amplifying unit configured to amplify color signals included in an image signal output from an image sensor according to a white balance gain, a first color signal information obtaining unit configured to obtain first color signal information from the color signals before being amplified by the white balance amplifying unit, and a white balance gain control unit configured to calculate a white balance gain based on second color signal information obtained from the color signals amplified by the white balance amplifying unit and a parameter determined based on the first color signal information and to provide the white balance gain to the white balance amplifying unit.

12 Claims, 10 Drawing Sheets

IMAGE PROCESSING APPARATUS PERFORMING WHITE BALANCE CONTROL

BACKGROUND OF THE INVENTION

1. Field of the Invention

The present invention relates to an image processing apparatus configured to estimate a light source and to perform appropriate white balance control according to the estimated light source, and a method thereof.

2. Description of the Related Art

Recent video cameras (camcorders) perform automatic white balance control using an output from an image sensor instead of using an external sensor. For example, a video camera obtains color-difference signals (R-Y and B-Y) and a luminance signal (Y) from red (R), green (G), and blue (B) color signals. The video camera divides image data into a plurality of blocks and obtains a mean value of the signals for each divided block. The video camera then extracts a color signal component close to white from the mean value of each divided block and performs control such that a mean value of the extracted color signal component close to white reaches a target white color (see Japanese Patent Application Laid-Open No. 05-64219).

When a video camera performs automatic white balance control on a moving image as described above, a drastic change in white balance may cause an unnatural video image. Consequently, a white balance gain needs to be changed gradually with time. Therefore, in the case of a moving image, it is more appropriate to adjust the white balance control by performing a feedback control. The feedback control uses color data that have been amplified with white balance control such that the white balance can be controlled after confirming the control result.

The white extraction method described above extracts a green color of fluorescent light as white, and thus the green color region is included in the white extraction range. As a result, the green color of a turf or a tree is extracted as white and is adjusted to become closer to the target white color, so that an image of the turf or the tree may become discolored.

Japanese Patent Application Laid-Open No. 08-79786 discusses a method for extracting white color more accurately. The discussed method detects a green color signal from signals included in the white extraction range and performs control such that a green signal of low luminance will not be easily extracted as a white color signal. As a result, the green color of low luminance in objects, such as a turf or a tree, is not extracted as white and is not discolored by the white balance control. Thus, the green color in a light source, such as fluorescent light, is appropriately controlled to become an achromatic color.

Japanese Patent Application Laid-Open No. 05-64219 discusses determining whether the light source is indoor light or outdoor light based on the brightness of an object (or object illuminance). However, it is difficult to determine the light source using only the object illuminance. For example, since the illuminance of an object in the shade is low, the light source may be erroneously determined to be indoor light.

Furthermore, although Japanese Patent Application Laid-Open No. 08-79786 discusses extracting a green color signal from the color signals, the color of an object changes greatly depending on the white balance gain when feedback control is performed for adjusting white balance. Therefore, it is difficult to extract only the desired color signal.

Figure 16A:
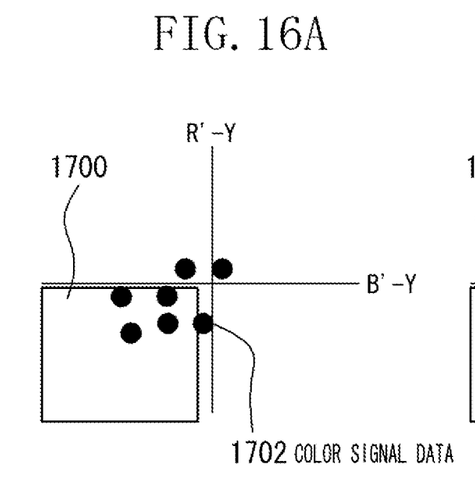
FIGS. 16A and 16B each illustrate a green color region and a distribution of color signal data in a two-dimensional coordinate system in which color-difference signals R'-Y and B'-Y are expressed along the respective axes.
Figure 16B:
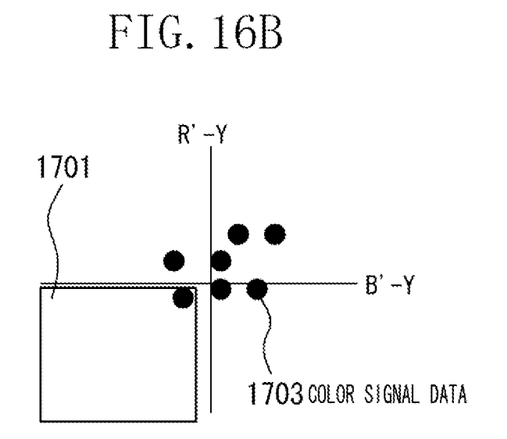

The above-described problem will be discussed in detail below. FIGS. 16A and 16B each illustrate a green color region and a distribution of color signal data in a two-dimensional coordinate system in which a color-difference signal B'-Y is expressed along the abscissa and a color-difference signal R'-Y is expressed along the ordinate. R' and B' represent color signals that have been amplified according to the white balance gain. FIGS. 16A and 16B thus illustrate the distribution of color signal data that have been amplified with white balance control. FIGS. 16A and 16B include green color regions (green regions) 1700 and 1701 and distributions of color signal data 1702 and 1703, respectively.

In FIG. 16A, most of color signal data 1702 is included in the green region 1700. FIG. 16B illustrates the state after the white balance gain is changed from the state illustrated in FIG. 16A. In FIG. 16B, the signals determined as green in FIG. 16A are changed to be close to achromatic color signals, so that the green region 1701 does not include many color signal data 1703. Therefore, it is difficult to extract a green signal from the image signals of an object in the state illustrated in FIG. 16B.

As described above, since color signals that have been amplified with white balance control are detected when a feedback control is used for adjusting white balance, the color distribution of an object image changes according to the white balance gain. As a result, it may be difficult to extract a specific color signal, such as a green color signal, from the image signals of the object.

SUMMARY OF THE INVENTION

According to an aspect of the present invention, an image processing apparatus includes a white balance amplifying unit configured to amplify color signals included in an image signal output from an image sensor according to a white balance gain, a first color signal information obtaining unit configured to obtain first color signal information from the color signals before being amplified by the white balance amplifying unit, and a white balance gain control unit configured to calculate a white balance gain based on second color signal information obtained from the color signals amplified by the white balance amplifying unit and a parameter determined based on the first color signal information and to provide the white balance gain to the white balance amplifying unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings. Each exemplary embodiment is directed to an imaging apparatus which includes an automatic white balance function with a feedback control.

First Exemplary Embodiment

Figure 1:
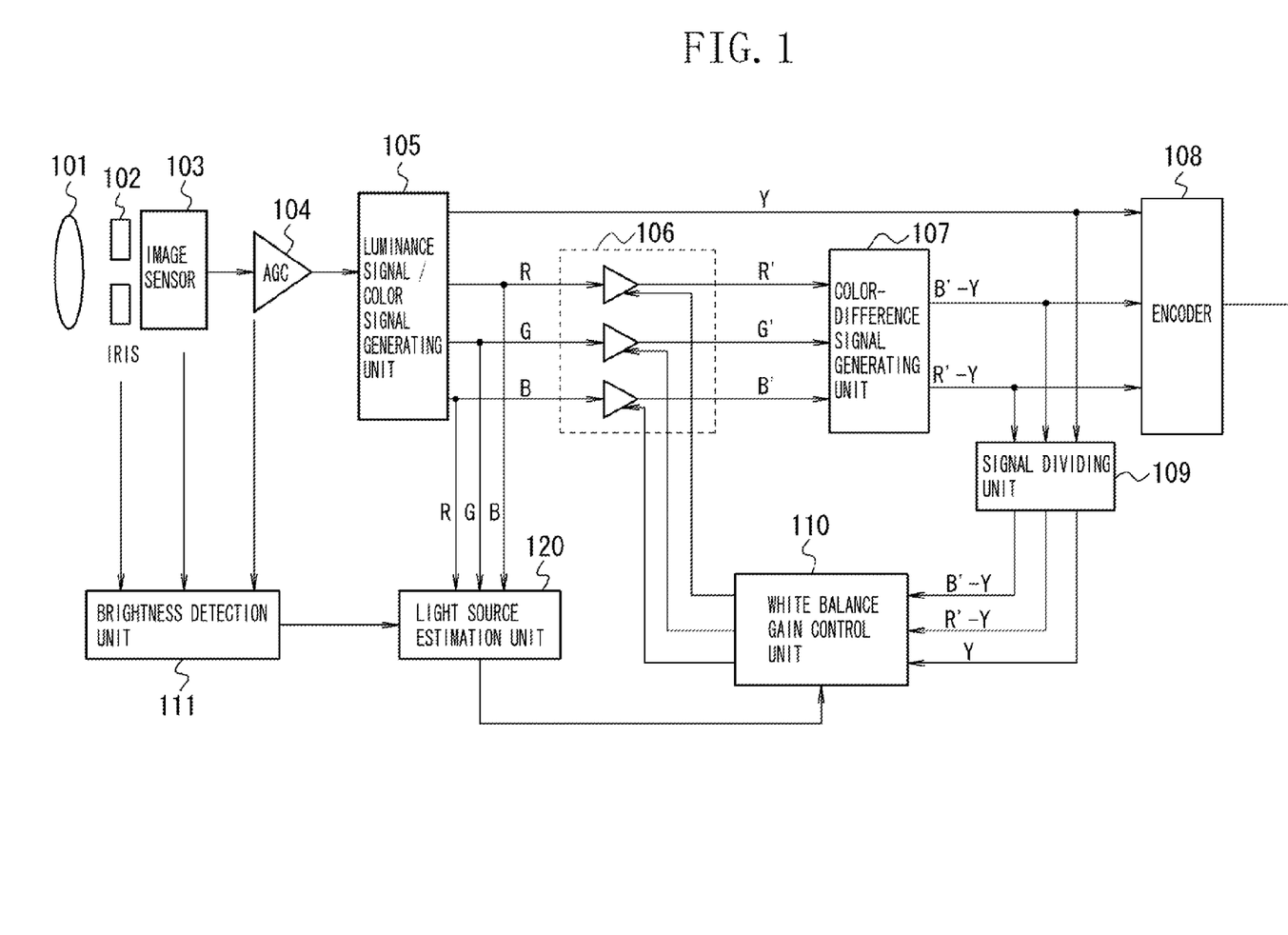
FIG. 1 is a block diagram of an imaging apparatus according to a first exemplary embodiment of the present invention.

FIG. 1 is a block diagram of an imaging apparatus which includes an automatic white balance function according to a first exemplary embodiment of the present invention. Referring to FIG. 1, a lens 101 forms an image of an object, and an image sensor 103 performs photoelectric conversion on the incident light received via an iris 102 to generate an electric signal. An automatic gain control (AGC) amplifier 104 amplifies the signal received from the image sensor 103 to an appropriate level.

A luminance signal/color signal generating unit 105 converts the signal amplified by the AGC amplifier 103 into a luminance signal (Y) and color signals (R, G, and B). A white balance amplifying unit 106 amplifies the color signals (R, G, and B) output from the luminance signal/color signal generating unit 105 according to a white balance gain and generates amplified color signals (R', G', and B'). A color-difference signal generating unit 107 generates color-difference signals (R'-Y and B'-Y). An encoder 108 converts the luminance signal (Y) and the color-difference signals (R'-Y and B'-Y) into a television signal in a standard form.

A signal dividing unit 109 divides the luminance signal (Y) and the color-difference signals (R'-Y and B'-Y) into a predetermined number of areas. A brightness detection unit 111 detects the brightness of an object (or object illuminance). A light source estimation unit 120 estimates a light source for an object based on the object illuminance, which is output from the brightness detection unit 111, and the color signals (R, G, and B), which are output from the luminance signal/color signal generating unit 105.

A white balance gain control unit 110 determines a white balance gain to be used by the white balance amplifying unit 106 based on the signals output from the signal dividing unit 109 and the light source information output from the light source estimation unit 120.

Operation of the imaging apparatus according to the first exemplary embodiment will be described below. The image sensor 103 performs photoelectric conversion on incident light to generate an electric signal. The AGC amplifier 104 amplifies the electric signal to an appropriate level and outputs the amplified signal to the luminance signal/color signal generating unit 105. The luminance signal/color signal generating unit 105 then generates a luminance signal (Y) and color signals (R, G, and B). The luminance signal/color signal generating unit 105 outputs the luminance signal (Y) to the encoder 108 and outputs the color signals (R, G, and B) to the white balance amplifying unit 106 and the light source estimation unit 120.

The white balance amplifying unit 106 amplifies the color signals (R, G, and B) based on the white balance gain output from the white balance gain control unit 110, and outputs the amplified color signals (R', G', and B') to the color-difference signal generating unit 107. The color-difference signal generating unit 107 then generates color-difference signals (R'-Y and B'-Y) from the color signals (R', G', and B') and outputs the color-difference signals (R'-Y and B'-Y) to the encoder 108 and the signal dividing unit 109. The encoder 108 generates a television signal in a standard form, such as NTSC, from the luminance signal (Y) and the color difference signals (R'-Y and B'-Y) and outputs the television signal.

Figure 14:
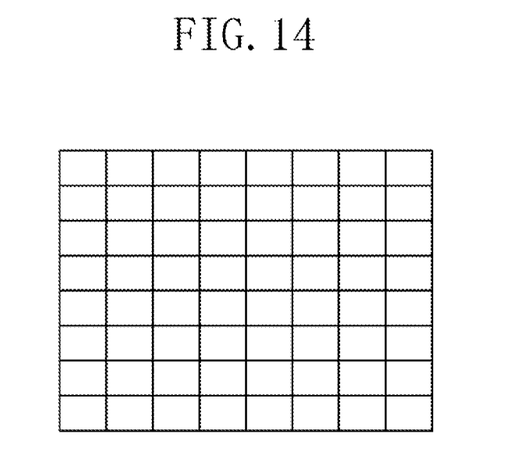
FIG. 14 illustrates a division frame for use with a signal division unit according to an exemplary embodiment of the present invention.

The signal dividing unit 109 divides the image signal into 8 by 8 blocks as illustrated in FIG. 14 and calculates the mean values of the luminance signal (Y) and the color-difference signals (R'-Y and B'-Y) for each block. The signal dividing unit 109 can also divide the image signal into any number of blocks other than 8 by 8 blocks. The signal dividing unit 109 then outputs the mean values to the white balance gain control unit 110.

The brightness detection unit 111 receives signals indicating the opening position of the iris 102, the control state of an electronic shutter of the image sensor 103, and gain controlled state of the AGC amplifier 104. The brightness detection unit 111 thus detects the brightness of an object (object illuminance) from such information and outputs the detected object illuminance to the light source estimation unit 120.

The light source estimation unit 120 estimates a light source based on the object illuminance output from the brightness detection unit 111 and the color signals (R, G, and B) output from the luminance signal/color signal generating unit 105.

Figure 2:
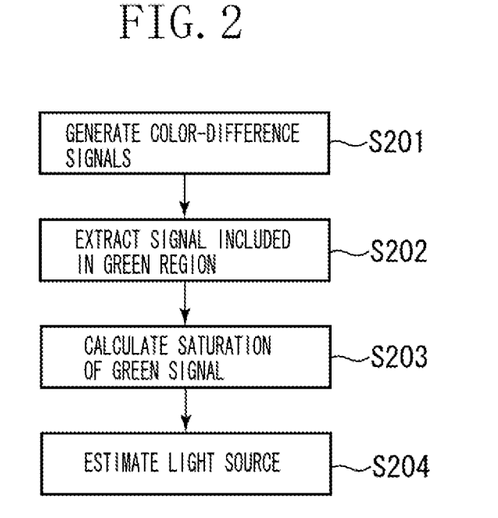
FIG. 2 is a flowchart illustrating a process for estimating a light source with a light source estimation unit according to the first exemplary embodiment of the present invention.

FIG. 2 is a flowchart illustrating a process for estimating a light source performed by the light source estimation unit 120. In step S201, the light source estimation unit 120 generates a luminance signal (Y) and color-difference signals (R-Y and B-Y) from the color signals (R, G, and B) output from the luminance signal/color signal generating unit 105.

Figure 3:
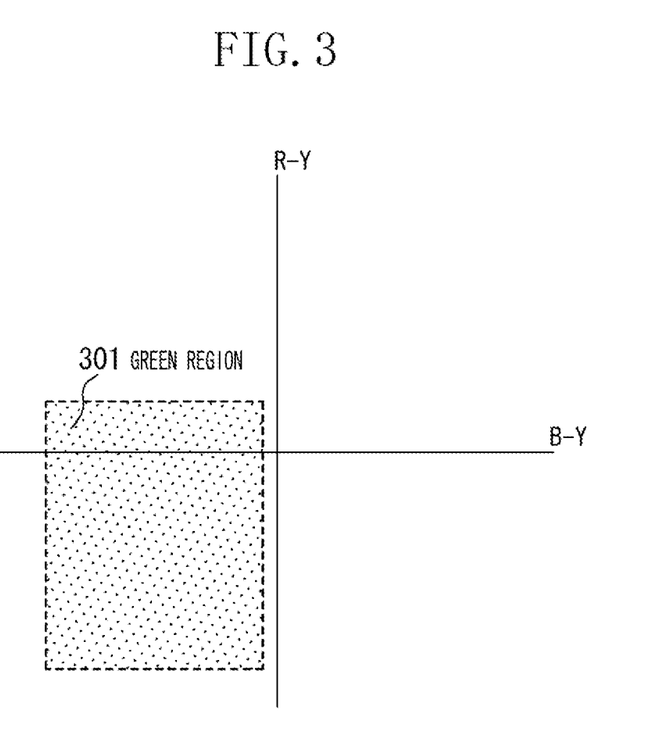
FIG. 3 illustrates a green region in a two-dimensional coordinate system in which color-difference signals R-Y and B-Y are expressed along the respective axes according to the first exemplary embodiment of the present invention.

In step S202, the light source estimation unit 120 obtains a color signal belonging to a green hue from the generated color-difference signals (R-Y and B-Y). FIG. 3 illustrates a region 301 corresponding to the yellow to green hue (a green region) in a two-dimensional coordinate system in which color-difference signals (R-Y and B-Y) are represented along the respective axes. The light source estimation unit 120 checks whether the input color signals are included in the green region 301 and extracts a signal (green signal) included in the green region 301.

In step S203, the light source estimation unit 120 calculates a mean saturation of the green signal extracted in step S202. In step S204, the light source estimation unit 120 estimates a light source based on the relation between the object illuminance output from the brightness detection unit 111 and the saturation of the green signal calculated in step S203 and based on the distribution of light sources illustrated in FIG. 4.

Figure 4:
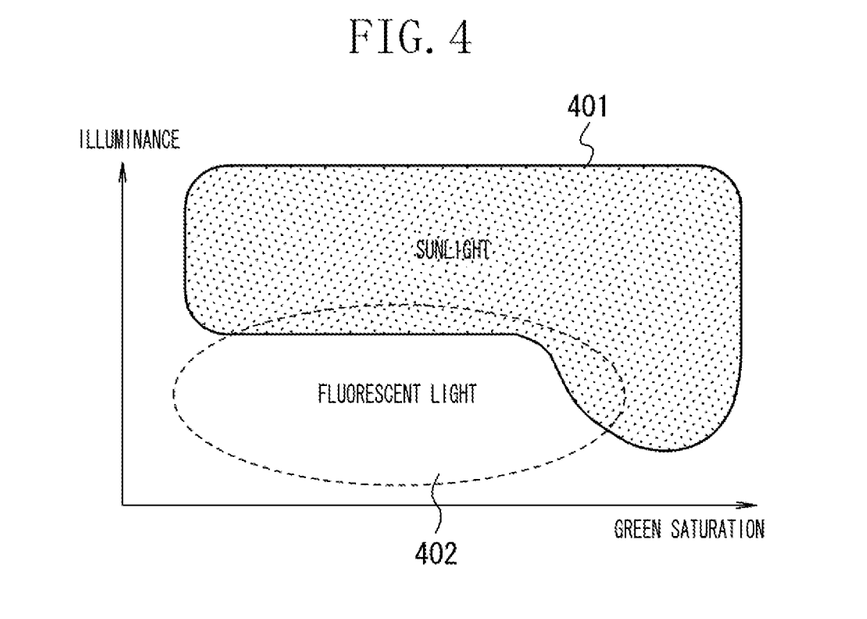
FIG. 4 illustrates a distribution of light sources according to the first exemplary embodiment of the present invention.

FIG. 4 illustrates the distribution of sunlight (outdoor light) 401 and the distribution of fluorescent light (indoor light) 402 in terms of the brightness of an object (object illuminance) and green saturation. The distribution indicates that the illuminance is high when the light source is sunlight, and that the illuminance is low when the light source is fluorescent light. However, if the green saturation is high, the light source is sunlight even if the illuminance is low. This is because the extracted green signal is often obtained from a green color of a turf or a tree under the sunlight instead of a green color in the fluorescent light in the case of a low illuminance and a high green saturation.

The light source estimation unit 120 obtains light source information (i.e. outdoor light or indoor light) according to the above-described steps and outputs the light source information to the white balance gain control unit 110.

Figures 15A, 15B:
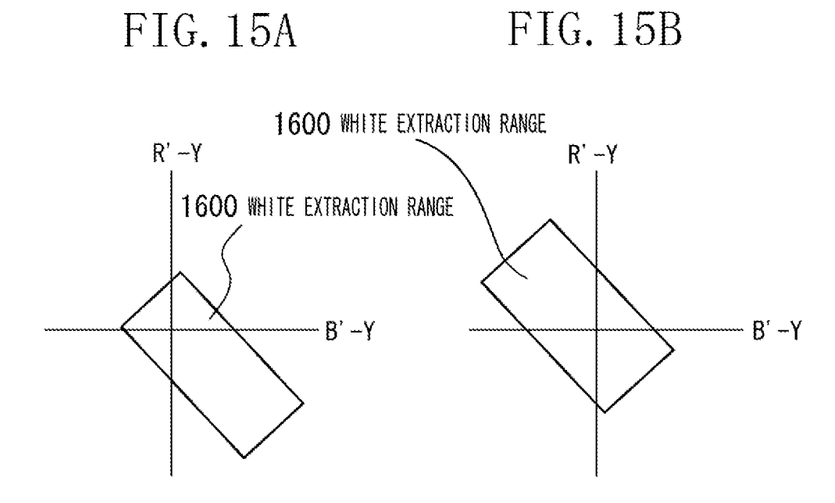
FIGS. 15A and 15B each illustrate a white extraction range for extracting a color signal close to white in a two-dimensional coordinate system in which color-difference signals R'-Y and B'-Y are expressed along the respective axes.

The white balance gain control unit 110 extracts a signal close to white from the luminance signal (Y) and the color-difference signals (R'-Y and B'-Y) and controls a white balance gain to bring the extracted signal close to a target white (e.g., the origin of the R'-Y and B'-Y coordinate system). FIGS. 15A and 15B each illustrate a white extraction range 1600 for extracting a color signal close to white in a two-dimensional coordinate system in which color-difference signals R'-Y and B'-Y are represented along the respective axes. FIG. 15A illustrates a white extraction range 1600 when the light source is sunlight, and FIG. 15B illustrates a white extraction range 1600 when the light source is artificial light.

The white balance gain control unit 110 adaptively changes the white extraction range 1600 according to the light source information from the light source estimation unit 120. When the light source information from the light source estimation unit 120 indicates outdoor light, the white balance gain control unit 110 sets the white extraction range 1600 to extract a color of sunlight. That is, a blue area is expanded and a red area is narrowed as illustrated in FIG. 15A, so that a color in a high color temperature region is extracted as white. On the other hand, when the light source information indicates indoor light, the white balance gain control unit 110 sets the white extraction range 1600 to include red and green areas (i.e., to narrow a blue area) as illustrated in FIG. 15B. Consequently, a color of low color temperature in fluorescent light is extracted.

The white balance gain control unit 110 thus extracts a signal close to white from the image signal based on the white extraction range 1600 set as described above. The white balance gain control unit 110 then determines a white balance gain such that the extracted signal close to white becomes close to a target white. The resulting white balance gain is output to the white balance amplifying unit 106. The white balance amplifying unit 106 amplifies a subsequent input image signal according to the input white balance gain.

As described above, the present exemplary embodiment estimates a light source using the color signals (R, G, and B) generated before being input to the white balance amplifying unit 106. As a result, a color can be extracted without influence of the gain controlled state of white balance. Thus, a light source can be estimated with high accuracy.

Moreover, the present exemplary embodiment controls white balance by performing a feedback control which extracts a color signal that has been amplified with white balance control. Therefore, a stable and robust white balance control, which is appropriate for a moving image, can be achieved.

In the above-described exemplary embodiment, the white balance gain control unit 110 uses the light source estimation result to control the white extraction range 1600. However, the present invention is not limited to the above-described configuration. Any configuration that sets a parameter for determining a white balance gain using the light source estimation result can be included in the present invention. An example in which the light source estimation result is used to change a control range of the white balance gain instead of the white extraction range 1600 will be described below with reference to FIG. 5.

Figure 5:
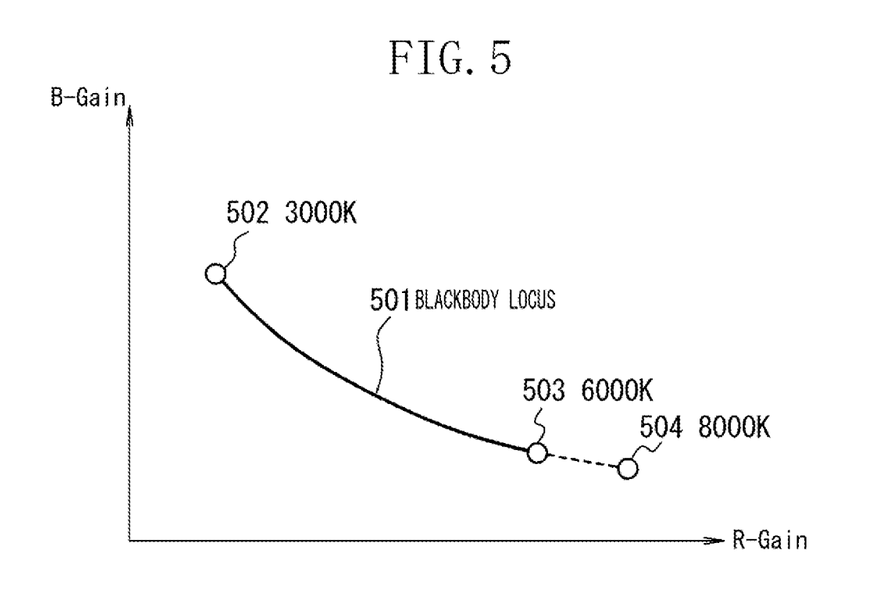
FIG. 5 illustrates a control range of a white balance gain in a white balance gain control unit according to the first exemplary embodiment of the present invention.

FIG. 5 illustrates a control range of a white balance gain in the white balance gain control unit 110. In FIG. 5, the horizontal axis represents an R-gain of white balance, and the vertical axis represents a B-gain of white balance. The curve 501 represents a blackbody locus. The white balance gain control unit 110 adjusts a white balance gain according to the blackbody locus. Point 502 indicates a white balance gain when the white balance is adjusted to a low color temperature light source whose color temperature is 3000K. Similarly, points 503 and 504 indicate white balance gains when the white balance is adjusted to high color temperature light sources of 6000K and 8000K, respectively.

In a case where the light source estimation unit 120 outputs light source information indicating outdoor light, the light source of a scene in a shade can also be of a high color temperature. Consequently, the white balance gain control unit 110 allows the control range of the white balance gain to be controlled to point 504, where the color temperature is 8000K. On the other hand, if the light source estimation unit 120 outputs light source information indicating indoor light, the light source will not be of a color temperature as high as 8000K. Therefore, the white balance gain control unit 110 sets point 503 at 6000K as the upper limit of the control range and performs control such that the white balance is not changed for color temperature above 6000K.

The above-described method uses the light source estimation result to control the variable range of the white balance gain. The light source estimation result can also be used to control the initial condition of the white balance gain when a power is switched on, to calculate the amount of change in the white balance gain or the change in speed when the white balance gain is changed, or to determine whether the white balance control is switched on or off.

The above-described exemplary embodiment estimates a light source based on the relation between the object illuminance and the green signal saturation. However, the present invention is not limited to the above-described method of estimating a light source. Any method can be employed as long as a light source is estimated using color signals generated before being amplified with white balance control. For example, a light source can be estimated using color information other than that of a green signal, such as a red signal. A light source can be estimated comprehensively using the luminance signal and color-difference signals (Y, R'-Y, and B'-Y) output from the signal dividing unit 109 after being amplified with white balance control, in addition to the object illuminance and the color signals (R, G, and B) generated before being amplified with white balance control.

Moreover, the above-described exemplary embodiment outputs the light source estimation result as sunlight (outdoor light) or fluorescent light (indoor light) to the white balance gain control unit 110. However, the light source estimation result is not limited to that. Information indicating that the light source is of a low color temperature, such as incandescent light, or an estimate value of the color temperature can be output to the white balance gain control unit 110.

Furthermore, the estimation of a light source is not limited to be made from color signals corresponding to one frame of an input image. A mean value of color signals of a plurality of frames can also be used. Moreover, a light source can be estimated for each frame, and a representative value of the light source estimation can be calculated from the light source estimation results of each of a plurality of frames. The representative value of the light source estimation is output to the white balance gain control unit 110. Accordingly, a white balance control using a more accurate result of light source estimation which is unaffected by the light source condition of one frame can be performed.

Moreover, the light source estimation unit 120 can estimate a light source based on a captured scene, which is estimated using color signals generated before being amplified with white balance control. For example, a blue color signal is extracted from the upper part of a captured image to determine whether the captured scene is the sky or in the shade. If both the saturation and the illuminance of the extracted blue color are high, the captured scene is determined to be the sky. If either the saturation or the illuminance of the blue color is low, the captured scene is determined to be a scene in the shade. If the scene is determined to be the sky, the color temperature of the light source is determined to be approximately 5000K. On the contrary, if the scene is determined to be a scene in the shade, the color temperature of the light source is determined to be 6000K to 7000K. The light source estimation unit 120 outputs such color temperature information of the light source to the white balance gain control unit 110. The white balance gain control unit 110 determines or corrects the white balance gain based on the estimated color temperature information. As a result, a white balance control according to the captured scene can be performed.

Second Exemplary Embodiment

A second exemplary embodiment of the present invention is directed to generating color signals that have not been amplified with white balance control from color signals that have been amplified with white balance control, and using the resulting color signals to estimate a light source.

Figure 6:
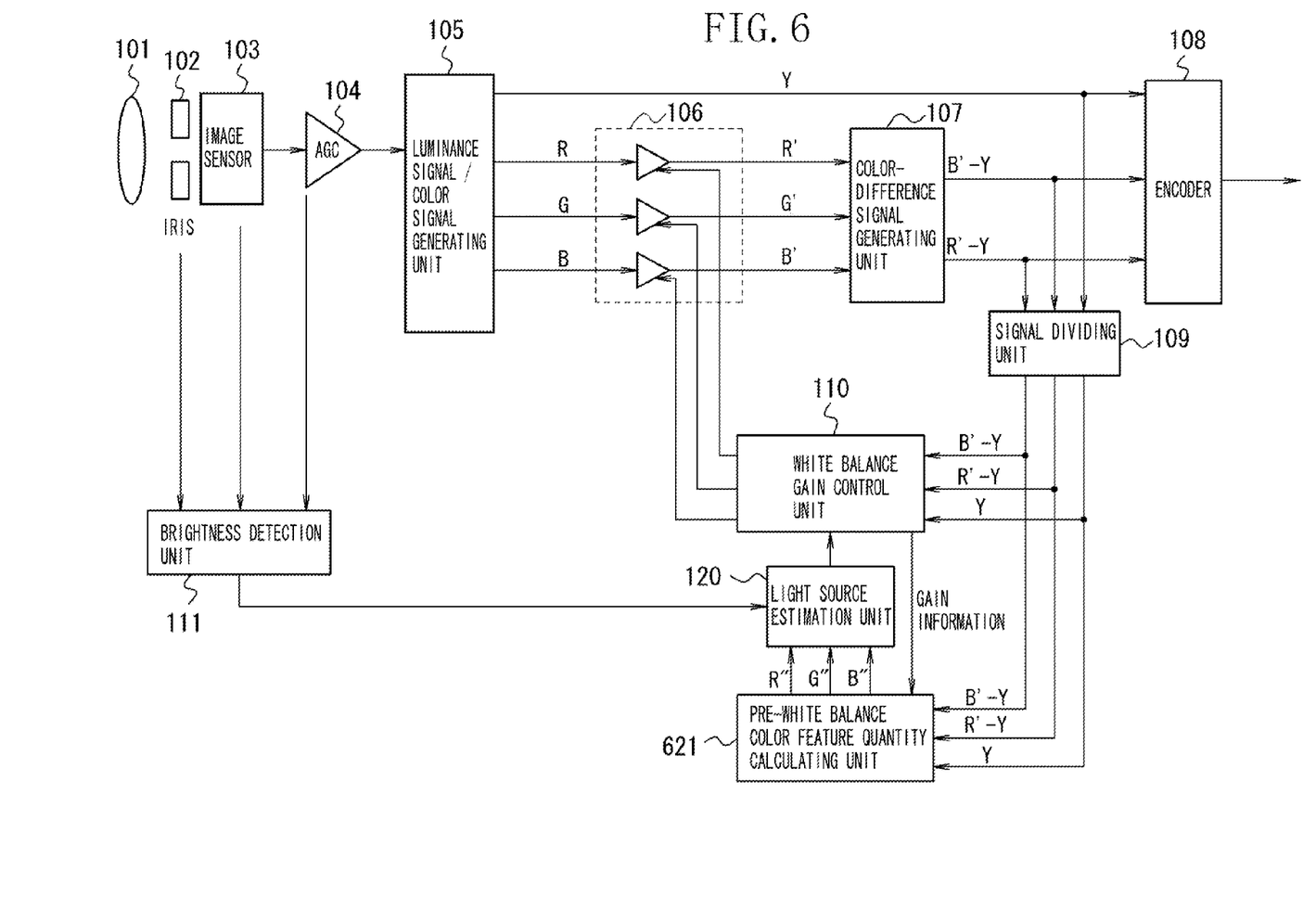
FIG. 6 is a block diagram of an imaging apparatus according to a second exemplary embodiment of the present invention.

FIG. 6 is a block diagram of an imaging apparatus which includes an automatic white balance function according to the second exemplary embodiment. Components similar to those of the first exemplary embodiment are denoted by the same reference numerals, and a description of the configuration similar to that of the first exemplary embodiment will not be repeated. In the first exemplary embodiment, the luminance signal/color signal generating unit 105 outputs color signals (R, G, and B) to the light source estimation unit 120. In the second exemplary embodiment, a pre-white balance color feature quantity calculating unit 621 outputs estimate values of R, G, and B signals (R", G", and B") to the light source estimation unit 120.

Operation of the imaging apparatus according to the second exemplary embodiment will be described below. As in the first exemplary embodiment, the signal dividing unit 109 outputs the image signal generated by the image sensor 103 as mean values of the luminance signal (Y) and the color-difference signals (R'-Y and B'-Y) for each of the 8 by 8 blocks, and the brightness detection unit 111 detects the object illuminance. Consequently, a description of the above process will not be repeated.

In the present exemplary embodiment, the signal dividing unit 109 outputs the mean values of the luminance signal (Y) and the color-difference signals (R'-Y and B'-Y) for each block to the white balance gain control unit 110 and to the pre-white balance feature quantity calculating unit 621. Thus, the pre-white balance feature quantity calculating unit 621 receives the mean values of the luminance signal (Y) and the color-difference signals (R'-Y and B'-Y) for each block from the signal dividing unit 101. The pre-white balance feature quantity calculating unit 621 further receives a white balance gain that is applied to the present image frame from the white balance gain control unit 110.

The pre-white balance feature quantity calculating unit 621 then generates R, G, and B signals (R', G', and B') from the input luminance signal (Y) and the color-difference signals (R'-Y and B'-Y) that have been amplified with white balance control. Then, the pre-white balance feature quantity calculating unit 621 re-applies the white balance gain output from the white balance gain control unit 110 to the R, G, and B signals (R', G', and B'). Consequently, the pre-white balance feature quantity calculating unit 621 calculates estimate values (R", G", and B") of the R, G, and B signals (R, G, and B) generated before being amplified with white balance control. The pre-white balance feature quantity calculating unit 621 performs the above-described process on a signal of each of 8 by 8 blocks and outputs the generated estimate values (R", G", and B") of the R, G, and B signals (R, G, and B) to the light source estimation unit 120.

The light source estimation unit 120 estimates a light source based on the object illuminance output from the brightness detection unit 111 and the estimate values (R", G", and B") of the R, G, and B signals output from the pre-white balance feature quantity calculating unit 621. The method of estimating a light source is similar to that described in the first exemplary embodiment, and a description of the process will not be repeated The light source estimation unit 120 outputs the estimated light source information to the white balance gain control unit 110. The white balance gain control unit 110 calculates a white balance gain similarly as in the first exemplary embodiment and outputs the calculated white balance gain to the white balance amplifying unit 106 and the pre-white balance feature quantity calculating unit 621.

Third Exemplary Embodiment

A third exemplary embodiment of the present invention is directed to performing a white balance gain control using two light source estimation results. That is, a result obtained by the method of the first exemplary embodiment and a result obtained by estimation from an image signal that has been amplified with white balance control are used.

Figure 7:
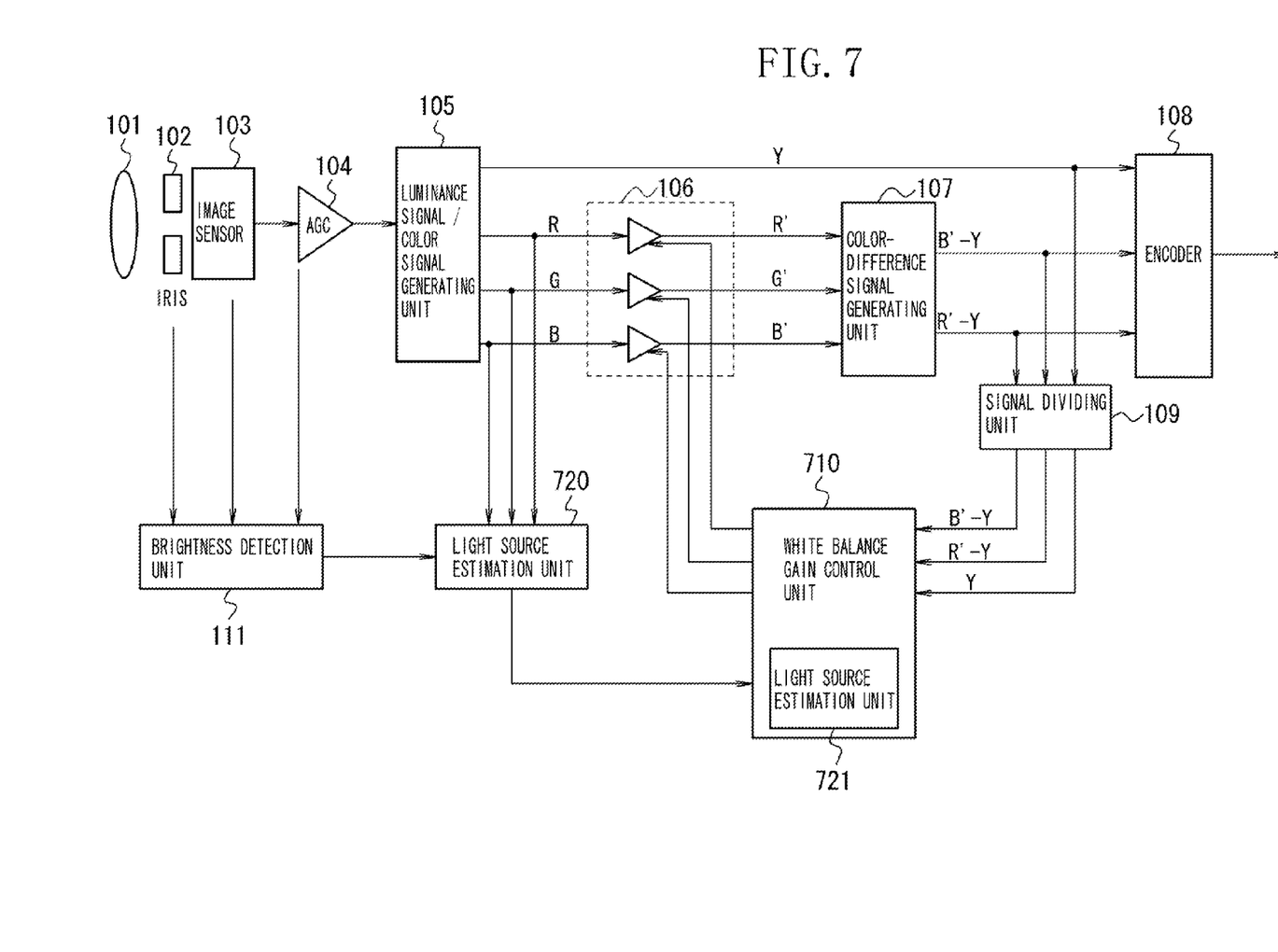
FIG. 7 is a block diagram of an imaging apparatus according to a third exemplary embodiment of the present invention.

FIG. 7 is a block diagram of an imaging apparatus which includes an automatic white balance function according to the third exemplary embodiment. Components similar to those of the first exemplary embodiment are denoted by the same reference numerals, and a description of the configuration similar to that of the first exemplary embodiment will not be repeated. The imaging apparatus according to the present exemplary embodiment includes a white balance gain control unit 710, which includes a light source estimation unit 721, instead of the white balance gain unit 110. Additionally, the imaging apparatus according to the present exemplary embodiment includes a light source estimation unit 720 instead of the light source estimation unit 120.

As in the first exemplary embodiment, the signal dividing unit 109 outputs an image signal generated by the image sensor 103 as mean values of the luminance signal (Y) and the color-difference signals (R'-Y and B'-Y) for each of 8 by 8 blocks, and the brightness detection unit 111 detects the object illuminance. Consequently, a description of the above process will not be repeated.

In the present exemplary embodiment, the light source estimation unit 720 estimates a light source with a similar method as the light source estimation unit 120 in the first exemplary embodiment. In addition, the light source estimation unit 720 calculates the reliability of a light source estimation result and outputs the calculated reliability to the white balance gain control unit 710 along with the light source estimation result. The reliability of a light source estimation result is a value that indicates how reliable the light estimation result is. The reliability of a light source determination result will be described in more detail below.

Figure 8:
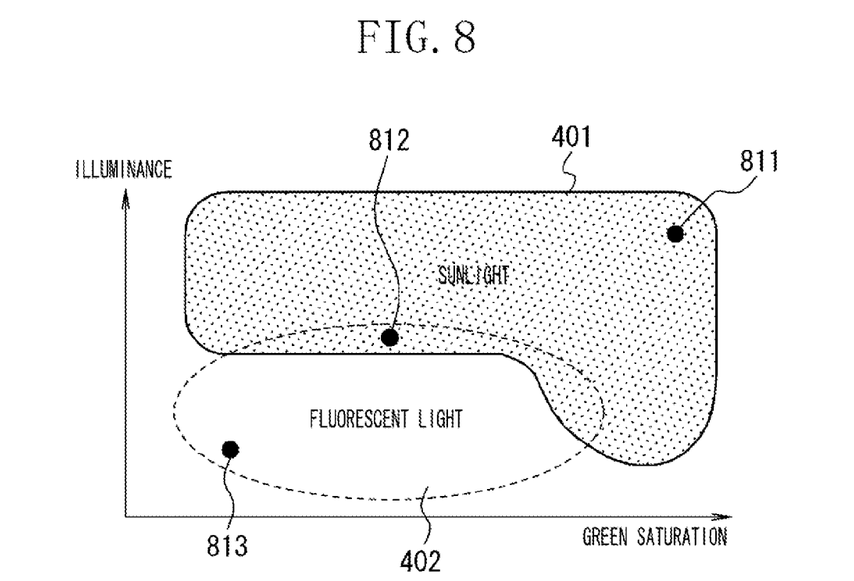
FIG. 8 illustrates a distribution of light sources according to the third exemplary embodiment of the present invention.

Similar to the first exemplary embodiment, the light source estimation unit 720 estimates a light source based on the distribution of light sources illustrated in FIG. 8. FIG. 8 illustrates the distribution of sunlight (outdoor light) 401 and the distribution of fluorescent light (indoor light) 402 with respect to the object illuminance and green saturation as the axes, as in FIG. 4 of the first exemplary embodiment. Points 811, 812, and 813 indicate the states of the object illuminance and green saturation when an object is captured.

For example, the light source estimation unit 720 estimates the light source of the points 811 and 812 as sunlight and the light source of the point 813 as fluorescent light. The light source estimation unit 720 then obtains the reliability of the light source estimation results. The reliability is an index that indicates the certainty of the light source estimation result obtained from the light source estimation unit 720. Therefore, the reliability is high when the light source can be definitely determined as either sunlight or fluorescent light according to the distribution illustrated in FIG. 8.

In FIG. 8, since point 811 is clearly positioned in the distribution of sunlight 401, the possibility that the light source is sunlight is high, and thus the reliability of the light source estimation result becomes high. Similarly, since point 813 is clearly positioned in the distribution of fluorescent light 402, the possibility that the light source is a fluorescent light is high, and thus the reliability of the light source estimation result becomes high. On the other hand, point 812 is positioned in a portion where the distribution of sunlight 401 and the distribution of fluorescent light 402 overlap. Therefore, although the light source of point 812 is estimated as sunlight in the present exemplary embodiment, the reliability of the estimation result is low.

The light source estimation unit 720 outputs the light source estimation result and the reliability obtained as described above to the white balance gain control unit 710.

The white balance gain control unit 710 performs control based on the light source estimation result in a manner similar to the first exemplary embodiment. However, the process for estimating a light source is different from the process in the first exemplary embodiment.

Figure 9:
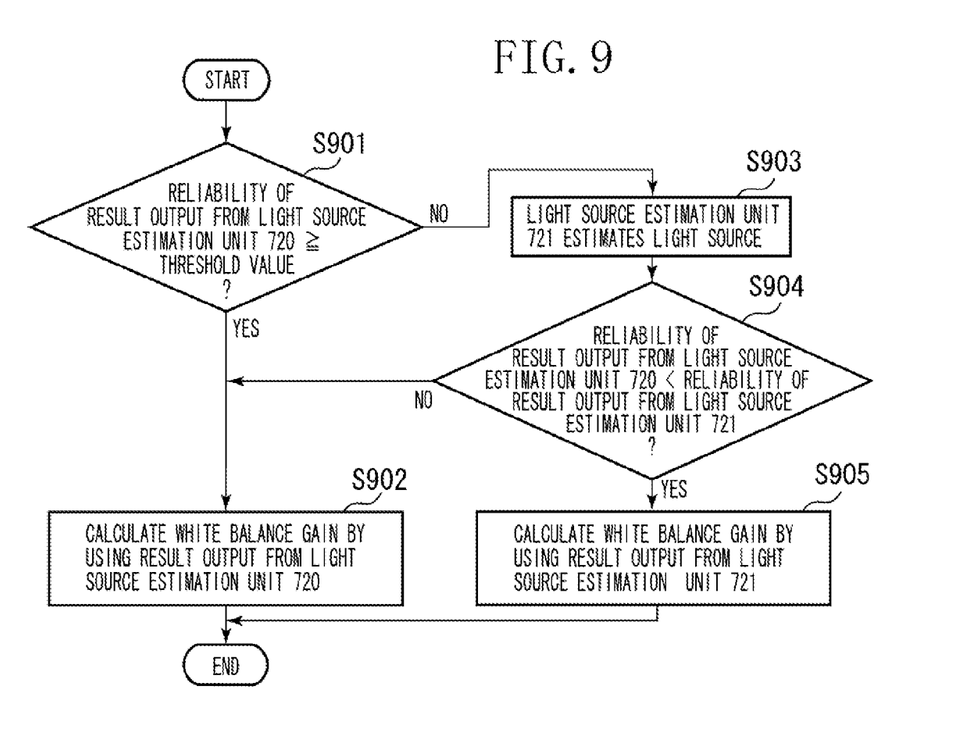
FIG. 9 is a flowchart illustrating a process performed by a white balance gain control unit according to the third exemplary embodiment of the present invention.

FIG. 9 is a flowchart illustrating the process performed by the white balance gain control unit 710 according to the present exemplary embodiment. In step S901, the white balance gain control unit 710 checks whether the reliability of the light source estimation result output from the light source estimation unit 720 is greater than or equal to a threshold value. If the reliability is greater than or equal to the threshold value (YES in step S901), the process proceeds to step S902.

If the reliability is lower than the threshold value (NO in step S901), the process proceeds to step S903.

In step S903, the light source estimation unit 721 estimates a light source based on the brightness information and the color-difference signals (R'-Y and B'-Y) that have been amplified with white balance control using a similar method as the light source estimation unit 720. Additionally, the light source estimation unit 721 calculates the reliability of the light source estimation using a similar method as the light source estimation unit 720.

In step S904, the white balance gain control unit 710 compares the reliabilities of the light source estimation results obtained by the light source estimation unit 720 and the light source estimation unit 721. If the reliability of the light source estimation result obtained by the light source estimation unit 721 is not higher than that obtained by the light source estimation unit 720 (NO in step S904), the process proceeds to step S902. If the reliability of the light source estimation result obtained by the light source estimation unit 721 is higher than that obtained by the light source estimation unit 720 (YES in step S904), the process proceeds to step S905.

In step S902, the white balance gain control unit 710 uses the light source estimation result obtained by the light source estimation unit 720 to calculate a white balance gain using a similar method as the first exemplary embodiment. In step S905, the white balance gain control unit 710 uses the light source estimation result obtained by the light source estimation unit 721 to calculate a white balance gain using a similar method as the first exemplary embodiment.

According to the above-described exemplary embodiment, image data that have been amplified with white balance control is used to estimate a light source. Consequently, the accuracy of the light source estimation is improved, and a more appropriate white balance control can be performed even when the reliability of the light source estimation result obtained by the light source estimation unit 720 is low.

The above-described exemplary embodiment selectively uses one of light source estimation results obtained by two light source estimation units. However, the present invention can be applied to any configuration as long as both of the light source estimation results estimated from image data that have not been amplified and that have been amplified with white balance control are used to control a white balance gain. More specifically, light source estimation results obtained with a feed-forward method and a feedback method can be used. For example, the light source estimation results can be combined to obtain a comprehensive light source estimation result. Moreover, the estimation result obtained with a feed-forward method can be used to correct the estimation result obtained with a feedback method. As a result, a light source can be estimated with high precision, and the white balance can be controlled accurately.

Fourth Exemplary Embodiment

A fourth exemplary embodiment of the present invention is directed to calculating a target value of a white balance gain based on color signals that have not been amplified with white balance control and using the target value to control a white balance gain. In the present exemplary embodiment, an imaging apparatus which can selectively capture a moving image and a still image can set a white balance gain according to a type of a captured image (still image or moving image).

Figure 10:
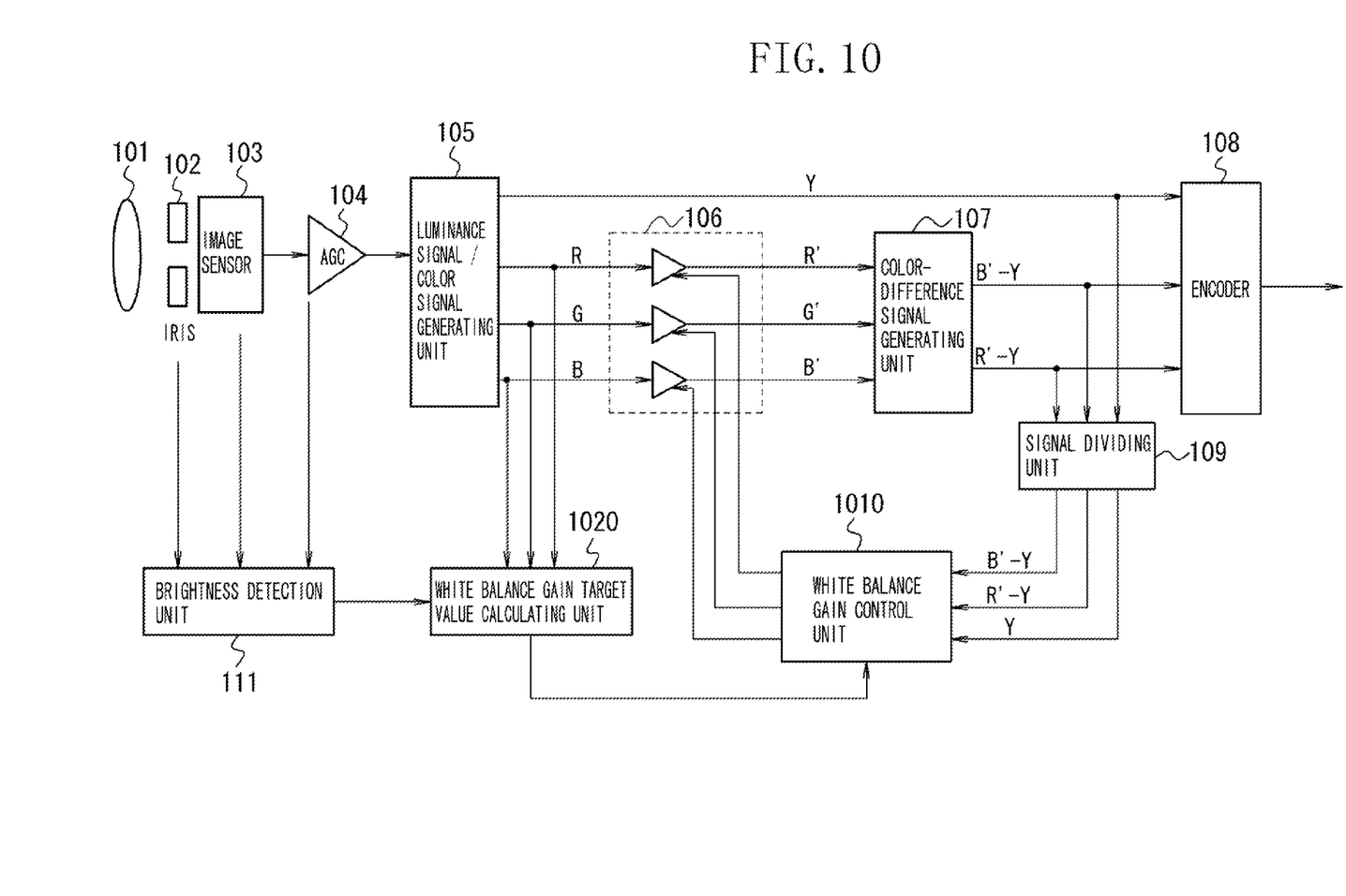
FIG. 10 is a block diagram of an imaging apparatus according to a fourth exemplary embodiment of the present invention.

FIG. 10 is a block diagram of an imaging apparatus which includes an automatic white balance function according to the fourth exemplary embodiment. Components similar to those of the first exemplary embodiment are denoted by the same reference numerals, and a description of the configuration similar to that of the first exemplary embodiment will not be repeated. The imaging apparatus according to the present exemplary embodiment includes a white balance gain control unit 1010 and a white balance gain target value calculating unit 1020 instead of the white balance gain control unit 110 and the light source estimation unit 120.

Operation of the imaging apparatus according to the present exemplary embodiment will be described below. As in the first exemplary embodiment, the signal dividing unit 109 outputs an image signal generated by the image sensor 103 as mean values of the luminance signal (Y) and the color-difference signals (R'-Y and B'-Y) for each of 8 by 8 blocks, and the brightness detection unit 111 detects the object illuminance. Consequently, a description of the above process will not be repeated.

Figure 11A:
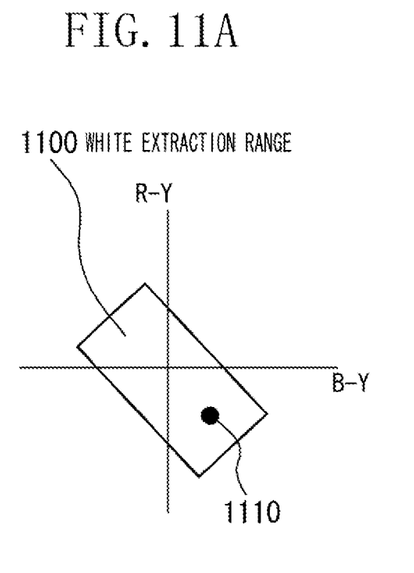
FIGS. 11A and 11B illustrate the position of a white color signal according to the fourth exemplary embodiment of the present invention.

The white balance gain target value calculating unit 1020 generates color-difference signals (R-Y and B-Y) from the input color signals (R, G, and B). The white balance gain target value calculating unit 1020 then extracts a color signal from a white extraction range 1100 of the assumed light source color. FIG. 11A illustrates the white extraction range 1100 in a two-dimensional coordinate system in which the color-difference signals R-Y and B-Y are represented along the respective axes. For example, if the mean value of the extracted color signal is positioned at point 1110 in FIG. 11A, the white balance gain target value calculating unit 1020 calculates a white balance gain to change the color of point 1110 to an achromatic color. The white balance gain target value calculating unit 1020 then outputs the obtained white balance gain to the white balance gain control unit 1010 as a target value.

Figure 12:
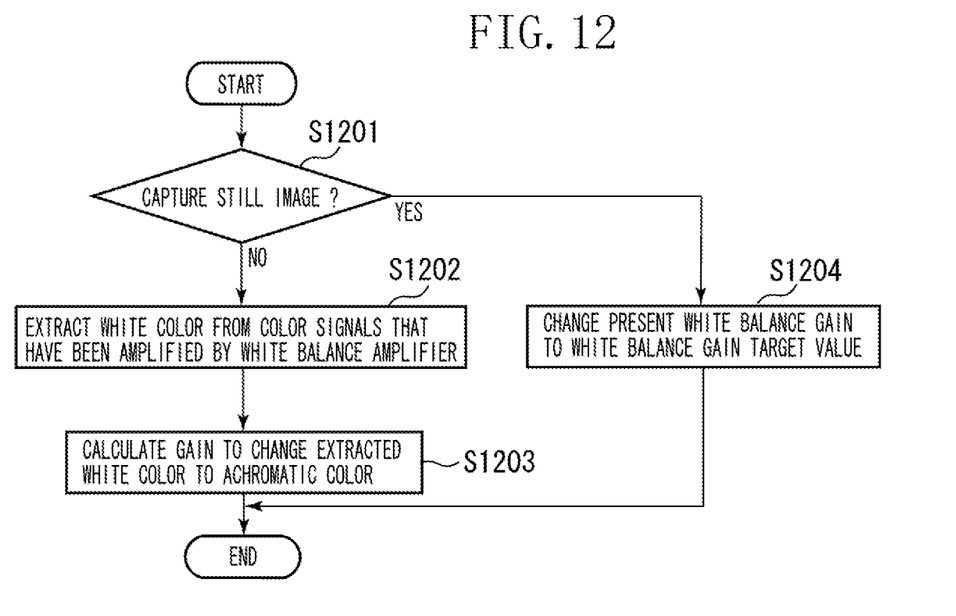
FIG. 12 is a flowchart illustrating a process performed by a white balance gain control unit according to the fourth exemplary embodiment of the present invention.

FIG. 12 is a flowchart illustrating an operation performed by the white balance gain control unit 1010. In the present exemplary embodiment, a user can press a still image capture button (not shown) to capture a still image while capturing a moving image. In step S1201, the white balance gain control unit 1010 checks whether an image frame to be subjected to white balance control is a still image frame. If the image frame is not a still image frame (NO in step S1201), the process proceeds to step S1202. If the image frame is a still image frame (YES in step S1201), the process proceeds to step S1204.

Figure 11B:
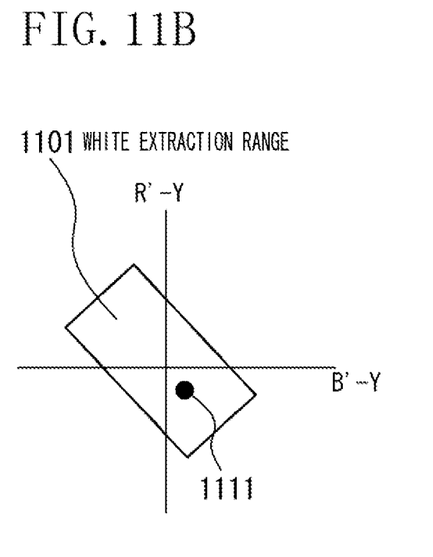

In step S1202, the white balance gain control unit 1010 extracts a white color portion from the color-difference signals (R'-Y and B'-Y) that have been amplified with white balance control in a manner similar to the first and second exemplary embodiments. FIG. 11B illustrates a white extraction range 1101 in a two-dimensional coordinate system in which the color-difference signals R'-Y and B'-Y are represented along the respective axes. For example, the white balance gain control unit 1010 extracts color signals in the white extraction range 1101 and calculates a mean value thereof. Point 1111 in FIG. 11B represents a mean value of color that is extracted as white.

Figure 13:
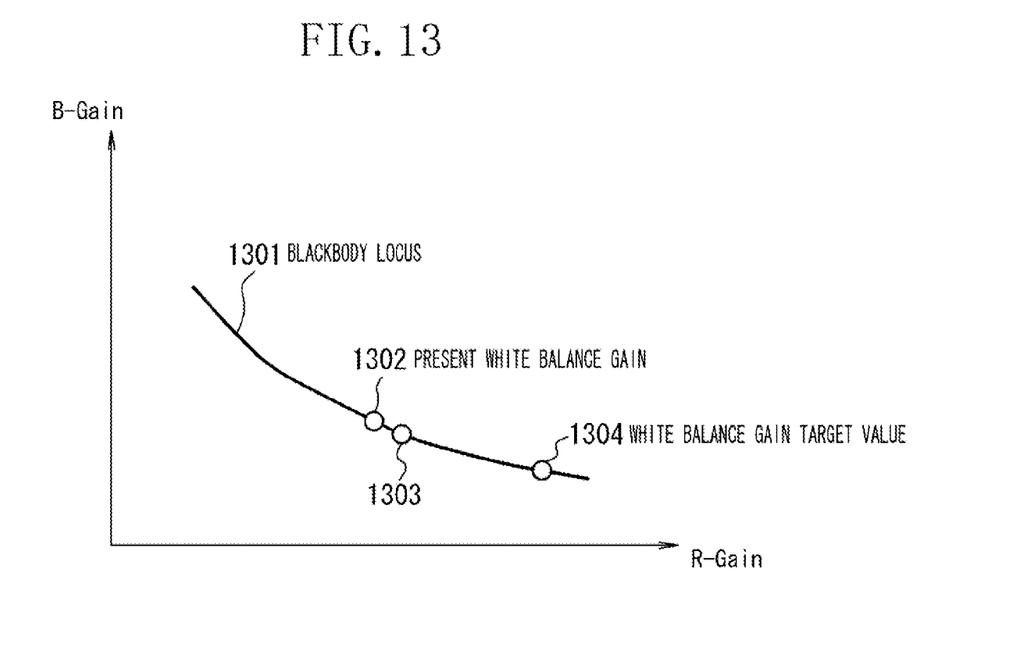
FIG. 13 illustrates white balance gain states according to the fourth exemplary embodiment of the present invention.

In step S1203, the white balance gain control unit 1010 calculates the amount of change in the white balance gain for adjusting the extracted color signal 1111 to become close to an achromatic color (i.e., the origin of the R'-Y and B'-Y axes). In the present exemplary embodiment, the white balance gain control unit 1010 calculates an amount of change that results in increasing the R-gain and decreasing the B-gain. FIG. 13 illustrates the state of the white balance gain adjusted in the above-described manner. The horizontal axis represents the R-gain, and the vertical axis represents the B-gain. The white balance gain control unit 1010 controls a white balance gain based on a blackbody locus 1301. Point 1302 represents a value of the white balance gain applied to the present input image, and point 1304 represents a target value of the white balance gain calculated by the white balance gain target value calculating unit 1020.

The white balance gain control unit 1010 gradually increases the R-gain and decreases the B-gain to bring the extracted white color (i.e., point 1111 in FIG. 11B) close to an achromatic color from the present white balance gain 1302. For example, the white balance gain control unit 1010 sets a white balance gain 1303 to be applied to the subsequent image frame to be processed. The white balance gain control unit 1010 can additionally perform control to prohibit the white balance gain from changing in a direction opposite to the direction from the present white balance gain 1302 to the target value 1304 (i.e., decreasing the R-gain and increasing the B-gain). Accordingly, in the case of a moving image, the white balance gain control unit 1010 can gradually set the white balance gain close to the target value while monitoring the color data (R'-Y and B'-Y) that have been amplified with white balance control.

On the other hand, in step S1204, the white balance gain control unit 1010 changes the white balance gain from the present white balance gain 1302 to the target value 1304.

The white balance gain control unit 1010 outputs the new white balance gain obtained in the above-described process to the white balance amplifying unit 106. The white balance amplifying unit 106 amplifies color signals based on the white balance gain output form the white balance gain control unit 1010. In the case of a still image, the white balance amplifying unit 106 amplifies the present input image. In the case of a moving image, the white balance amplifying unit 106 amplifies an image of subsequent frames.

As described above, when the white balance of a moving image is adjusted, a feedback control is gradually performed based on color signals that have been amplified with white balance control and based on the present white balance gain. Consequently, a stable white balance control can be realized. On the other hand, when a white balance control is performed on a still image, a white balance gain target value is generated using the color signals of a captured image frame, and the white balance gain is set according to the target value. Therefore, the present exemplary embodiment can solve a problem in performing a feedback control, such as a white balance adjustment not responding to a sudden change in the color temperature of a light source, and can realize an appropriate white balance control.

The present invention can also be achieved by providing a storage medium, which stores software (program code) for realizing the operations of the above-described exemplary embodiments, to a system or an apparatus. The program code stored in the storage medium can be read and executed by a computer (central processing unit (CPU) or micro-processing unit (MPU)) of the system or the apparatus.

In this case, the software (program code) itself realizes the operations of the embodiments. The software (program code) itself and the storage medium, which stores the software (program code), constitute the present invention. The storage medium can be, for example, a floppy disk, a hard disk, an optical disk, a magneto-optical disk, a compact disc-read-only memory (CD-ROM), a CD-recordable (CD-R), a CD-rewritable (CD-RW), a digital versatile disc (DVD), a DVD-ROM, a DVD-random access memory (DVD-RAM), a DVD-RW, a DVD+RW, a magnetic tape, a nonvolatile memory card, or a ROM.

Furthermore, the above-described exemplary embodiments can be realized by executing program code read by a CPU. An operating system (OS) or the like working on a computer can perform a part or the whole of processes according to instructions of the program code and realize functions he above-described exemplary embodiments.

Furthermore, program code read from a storage medium can be stored in a memory equipped in a function expansion board inserted in a computer or a function expansion unit connected to a computer, and a CPU in the function expansion board or the function expansion unit can execute all or part of the processing based on the instructions of the program code to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-250846 filed Sep. 15, 2006, which is hereby incorporated by reference herein in its entirety.

What is claimed is:

1. An image processing apparatus comprising:
    a signal generating unit configured to generate first color signal information including a luminance signal and color signals based on an image signal;
    a white balance amplifying unit configured to amplify the color signals according to a white balance gain;
    a light source estimation unit configured to estimate light source data of the image signal based on the first color signal information before being amplified by the white balance amplifying unit; and
    a white balance gain control unit configured to generate the white balance gain based on a parameter determined by the first color signal information and second color signal information obtained from color-difference data between the luminance signal and the color signals amplified by the white balance amplifying unit including within a white extraction range corresponding to the estimated light source data.

2. The image processing apparatus according to claim 1, wherein the light source estimation unit is configured to estimate the light source data based on object illuminance and the color signals.

3. The image processing apparatus according to claim 1, wherein the light source estimation unit is configured to estimate the light source data based on object illuminance and estimated values of color signals.

4. The image processing apparatus according to claim 1, wherein the light source estimation unit is configured to estimate the light source data based on object illuminance and the color signals, and output the estimated light source data and reliability of the estimated light source data.

5. An image processing method comprising:
    generating first color signal information including a luminance signal and color signals based on an image signal;
    amplifying the color signals according to a white balance gain;
    estimating light source data of the image signal based on the first color signal information before being amplified; and
    generating the white balance gain based on a parameter determined by the first color signal information and second color signal information obtained from color-difference data between the luminance signal and the amplified color signals including within a white extraction range corresponding to the estimated light source data.

6. The image processing method according to claim 5, wherein the estimated light source data is based on object illuminance and the color signals.

7. The image processing method according to claim 5, wherein the estimated light source data is based on object illuminance and estimated values of color signals.

8. The image processing method according to claim 5, further comprising outputting the estimated light source data and reliability of the estimated light source data, wherein the estimated light source data is based on object illuminance and the color signals.

9. An image processing apparatus comprising:
    a signal generating unit configured to generate first color signal information including a luminance signal and color signals based on an image signal;
    a white balance amplifying unit configured to amplify the color signals according to a white balance gain;
    a white balance gain target value calculating unit configured to generate a white balance gain target value based on the first color signal information before being amplified by the white balance amplifying unit; and
    a white balance gain control unit configured to generate the white balance gain based on a parameter determined by the first color signal information and second color signal information obtained from color-difference signals between the luminance signal and the color signals amplified by the white balance amplifying unit including within a white extraction range corresponding to the estimated light source data, and the white balance gain target value.

10. The image processing apparatus according to claim 9, wherein the white balance gain target value is based on an extracted color signal from the white extraction range.

11. An image processing method comprising:
    generating first color signal information including a luminance signal and color signals based on an image signal;
    generating color-difference signals between the luminance signal and the color signals;
    amplifying the color signals according to the white balance gain;
    outputting a white balance gain target value based on the first color signal information before being amplified; and
    generating the white balance gain based on a parameter determined by the first color signal information and second color signal information obtained from color-difference signals between the luminance signal and the amplified color signals including within a white extraction range corresponding to the estimated light source data, and the white balance gain target value.

12. The image processing method according to claim 11, wherein the white balance gain target value is based on an extracted color signal from the white extraction range.

* * * * *